United States Patent
Oguchi et al.

(10) Patent No.: US 7,613,825 B2
(45) Date of Patent: Nov. 3, 2009

(54) HIERARCHICAL PACKET PROCESSING SYSTEM AND METHOD, RELAY DEVICE AND SERVER

(75) Inventors: Naoki Oguchi, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 981 days.

(21) Appl. No.: 10/981,102

(22) Filed: Nov. 4, 2004

(65) Prior Publication Data

US 2005/0220098 A1    Oct. 6, 2005

(30) Foreign Application Priority Data

Mar. 31, 2004    (JP) ............................. 2004-108239

(51) Int. Cl.
*G06F 15/173*    (2006.01)
(52) U.S. Cl. ...................... 709/238; 709/202; 709/225; 709/226
(58) Field of Classification Search ................. 709/238, 709/202, 225, 226, 217, 219, 236, 246; 370/389, 370/392
See application file for complete search history.

(56) References Cited

U.S. PATENT DOCUMENTS 6,157,955 A * 12/2000 Narad et al. ................ 709/228
7,292,567 B2 * 11/2007 Terrell et al. ................ 370/363
7,340,535 B1 * 3/2008 Alam .......................... 709/246
2003/0126233 A1 * 7/2003 Bryers et al. ................ 709/219
2005/0060365 A1 * 3/2005 Robinson et al. ........... 709/203

FOREIGN PATENT DOCUMENTS

JP    2002-359637    12/2002

OTHER PUBLICATIONS

Notice of Rejection Ground with translation dated Feb. 24, 2009, for the corresponding Japanese Application 2004-108239.
A translation of the descriptions appearing in Figs. 5 and 6 in JP 2002-359637, filed Nov. 4, 2004.

* cited by examiner

*Primary Examiner*—Larry D Donaghue
*Assistant Examiner*—Nicholas Taylor
(74) *Attorney, Agent, or Firm*—Katten Muchin Rosenman LLP

(57) ABSTRACT

The hierarchical packet processing system comprises a relay unit and a server, which relay received packets. The relay unit comprises a call unit for calling up a prescribed service processing unit for performing the service process of a received packet, a first service processing unit for performing the service process of the received packet by the call of the call unit, a second service processing unit for performing a virtual service process of the received packet by the call of the call unit. The server comprises an external service processing unit for performing the arbitrary service process of the received packet instead of the second service processing unit when the call unit calls up the second service processing unit.

20 Claims, 14 Drawing Sheets

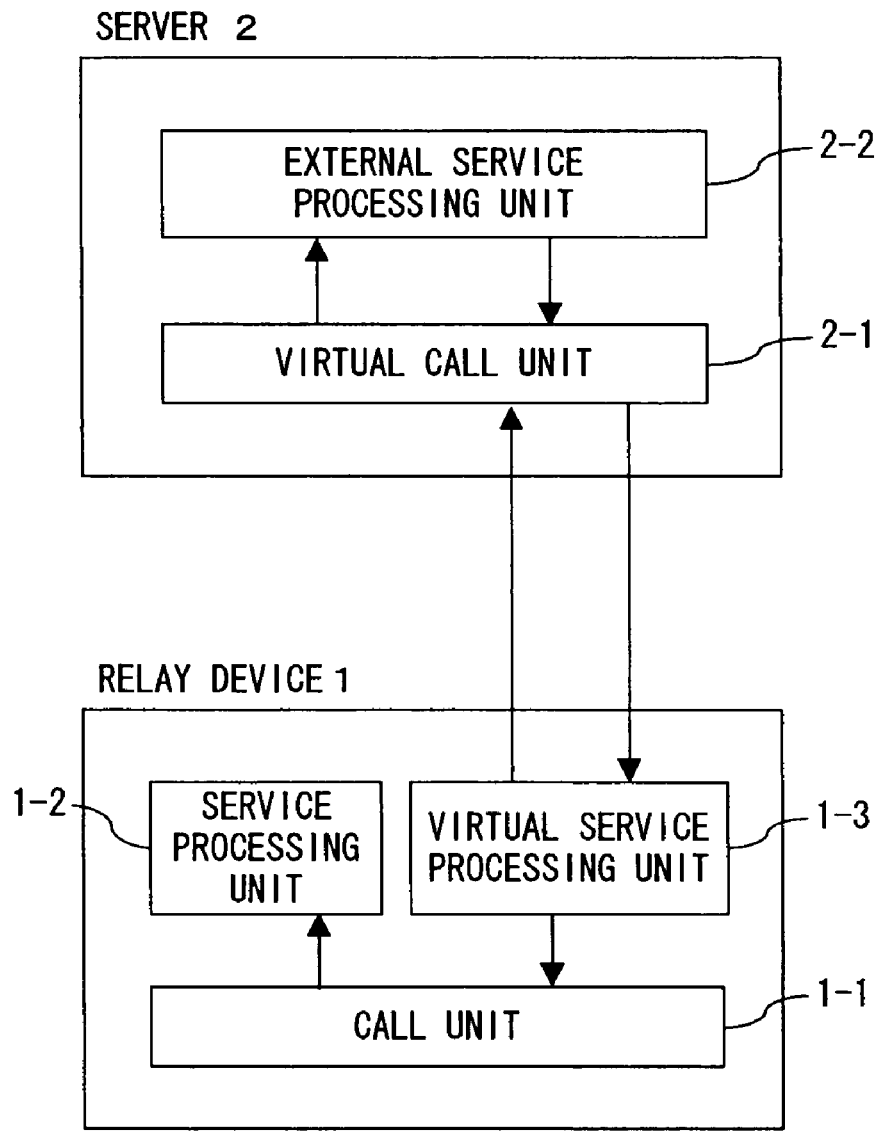
F I G. 1

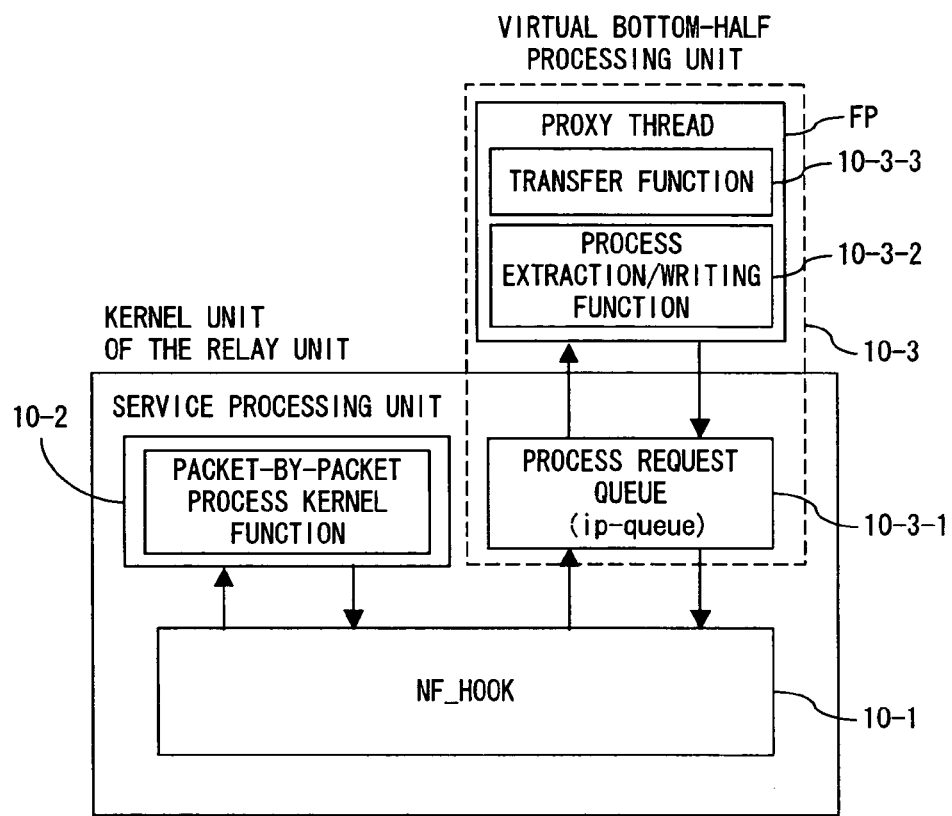
F I G. 2 A
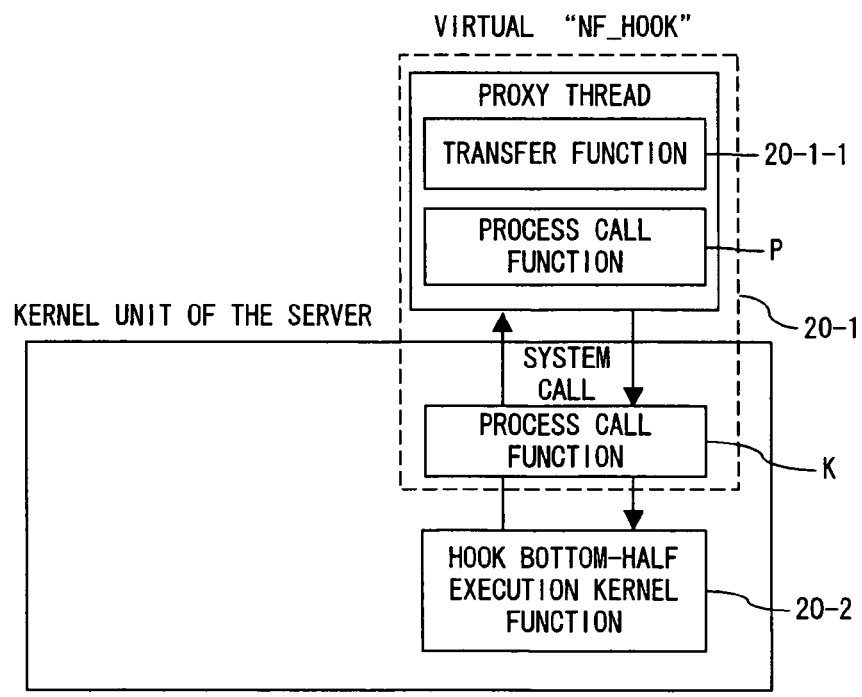
F I G. 2 B

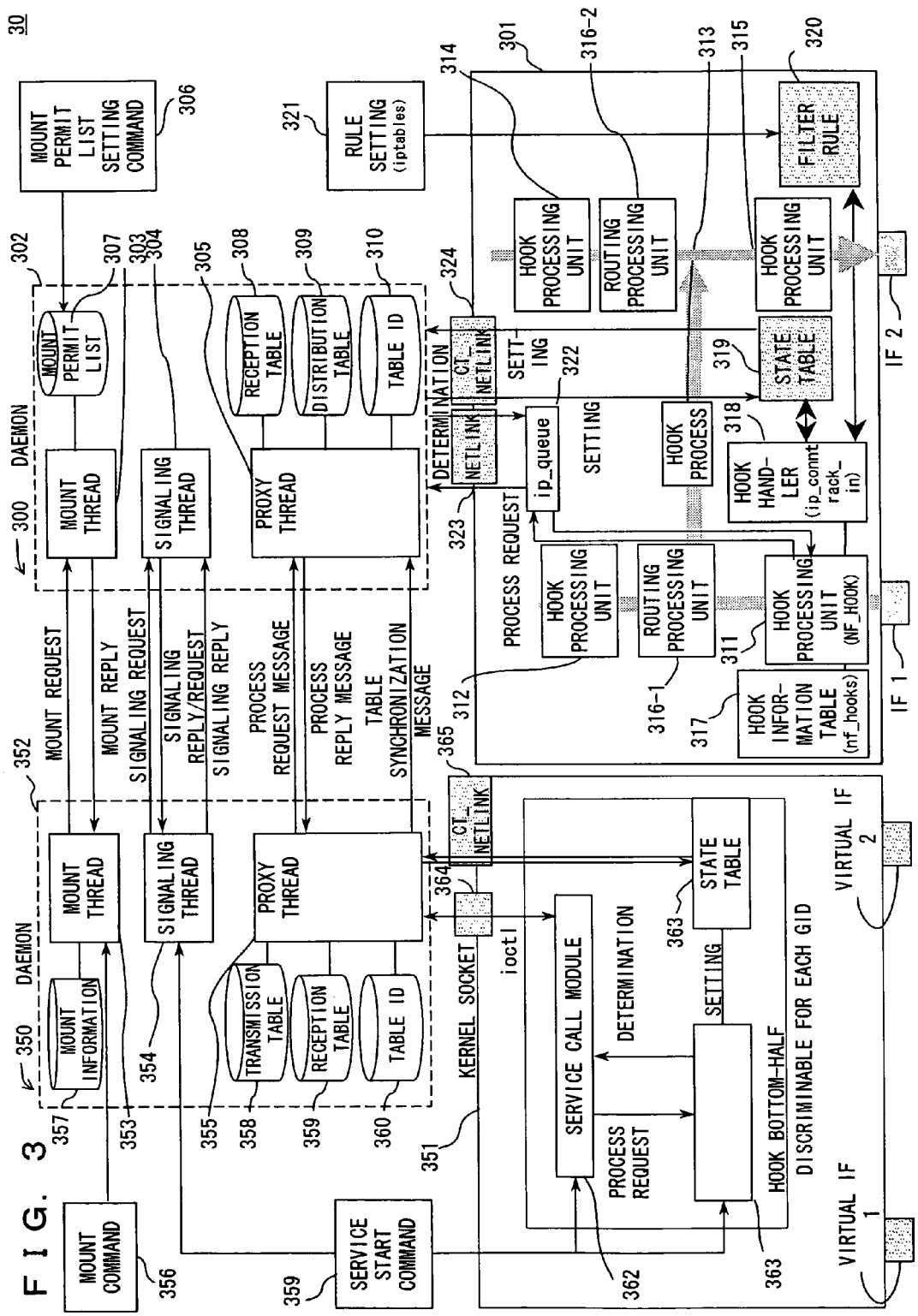

| NUMBER | UPWARD TUPLE | SRC IP | SRC PORT | DST IP | DST PORT | PROTOCOL TYPE | L3 status | L4status | helper | expecting | master |
|---|---|---|---|---|---|---|---|---|---|---|---|
| 1 | T1 | 192.168.10.1 | 49154 | 192.168.20.1 | 21 | TCP | IPS_ASSURED | sES | ftp_conntrack | T1 | |
| 2 | | | | | | | | | | | |
| 3 | | | | | | | | | | | |

| SRC IP | SRC PORT | DST IP | DST PORT | PROTOCOL TYPE | expecting |
|---|---|---|---|---|---|
| 192.168.10.1 | 49160 | 192.168.20.1 | 20 (ftp-data) | TCP | T1 |
| | | | | | |
| | | | | | |

452 453 454 455 456 451

PROCESS REQUEST MESSAGE 900 901 902

| COMMON HEADER | TRANSMITTING SOURCE IP ADDRESS | IP ADDRESS OF MESSAGE TRANSMITTING SOURCE EQUIPMENT |
| --- | --- | --- |
| | TRANSMITTING DESTINATION IP ADDRESS | IP ADDRESS OF MESSAGE TRANSMITTING DESTINATION EQUIPMENT |
| | TYPE | 05: PROCESS REQUEST MESSAGE |
| | MESSAGE LENGTH | VARIABLE |
| MESSAGE PECULIAR SECTION | SEQUENCE NUMBER | |
| | SERVICE ID | IDENTIFIER OF A TARGET SERVICE |
| | MARK VALUE | SERVICE CALL SOURCE IDENTIFIER |
| | PROCESS RESULT | UNUSED |
| | PROCESS REQUEST ID | PROCESS REQUEST IDENTIFIER |
| | REQUEST METHOD | PROCESS REQUEST CODE |
| | PROCESS DATA LENGTH | DATA PACKET LENGTH REQUESTING FOR A PROCESS |
| | PROCESS DATA | DATA REQUESTING FOR A PROCESS |
| | PROCESS REQUEST ID | PROCESS REQUEST IDENTIFIER |
| | REQUEST METHOD | PROCESS REQUEST CODE |
| | PROCESS DATA LENGTH | DATA PACKET LENGTH REQUESTING FOR A PROCESS |
| | PROCESS DATA | DATA REQUESTING FOR A PROCESS |

903

F I G. 9A

PROCESS REPLY 950 951 952

| COMMON HEADER | TRANSMITTING SOURCE IP ADDRESS | IP ADDRESS OF MESSAGE TRANSMITTING SOURCE EQUIPMENT |
| --- | --- | --- |
| | TRANSMITTING DESTINATION IP ADDRESS | IP ADDRESS OF MESSAGE TRANSMITTING DESTINATION EQUIPMENT |
| | TYPE | 06: PROCESS REPLY MESSAGE |
| | MESSAGE LENGTH | VARIABLE |
| MESSAGE PECULIAR SECTION | SEQUENCE NUMBER | |
| | SERVICE ID | IDENTIFIER OF A TARGET SERVICE |
| | MARK VALUE | SERVICE CALL SOURCE IDENTIFIER |
| | PROCESS RESULT | UNUSED |
| | PROCESS REQUEST ID | PROCESS REQUEST IDENTIFIER |
| | REQUEST METHOD | PROCESS REQUEST CODE |
| | PROCESS RESULT LENGTH | PROCESS RESULT LENGTH |
| | PROCESS RESULT DATA | PROCESS RESULT |
| | PROCESS REQUEST ID | PROCESS REQUEST IDENTIFIER |
| | REQUEST METHOD | PROCESS REQUEST CODE |
| | PROCESS DATA LENGTH | PROCESS RESULT LENGTH |
| | PROCESS RESULT DATA | PROCESS RESULT |

F I G. 9B 953

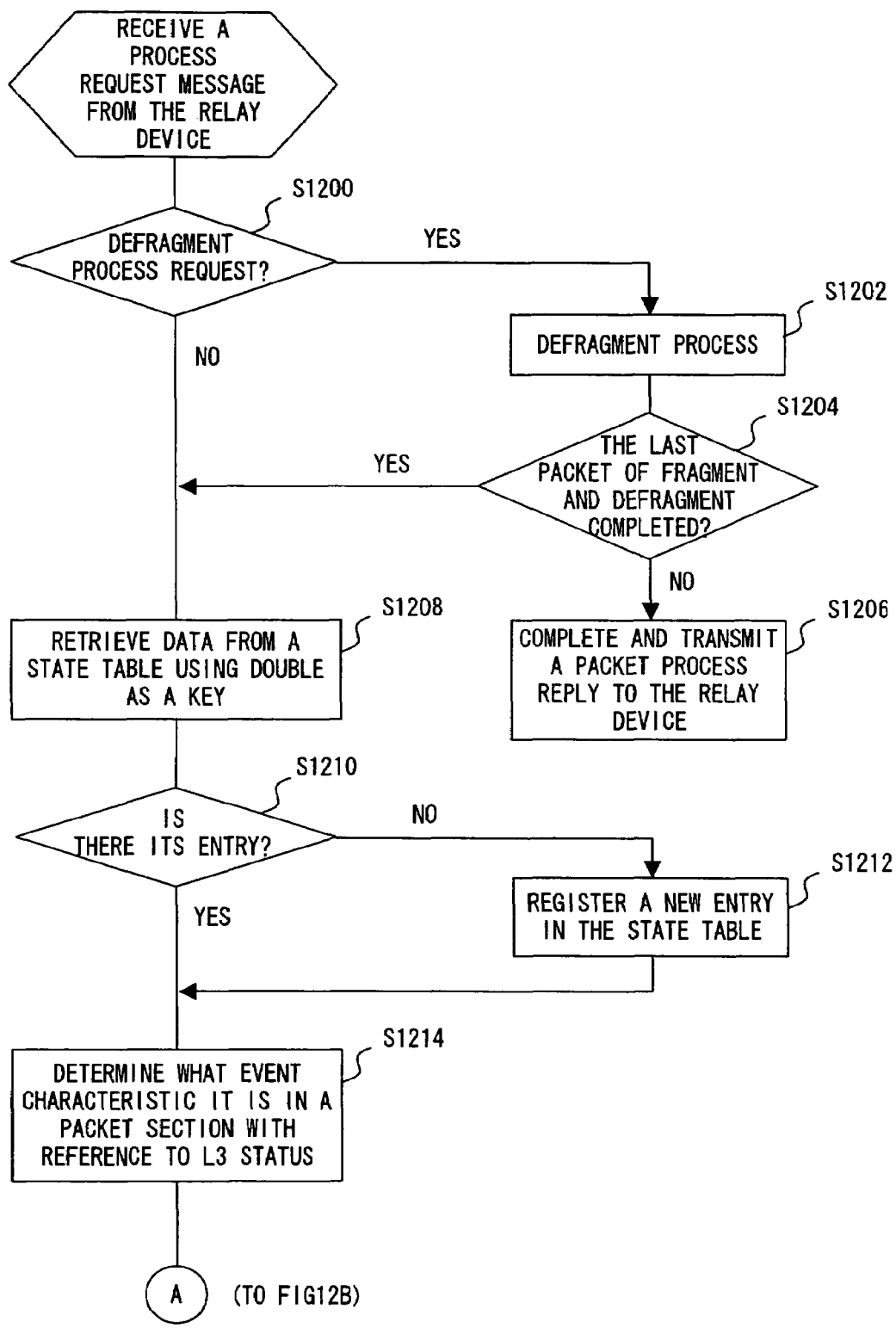
F I G. 1 2 A

```
/*        ORIGINAL */
/*        sNO,  sES,  sSS,  sSR,  sFW,  sTW,  sCL,  sCW,  sLA,  sLI        */
/*syn*/   {sSS,  sES,  sSS,  sSR,  sSS,  sSS,  sSS,  sSS,  sSS,  sLI },
/*fin*/   {sTW,  sFW,  sSS,  sTW,  sFW,  sTW,  sCL,  sTW,  sLA,  sLI },
/*ack*/   {sES,  sES,  sSS,  sES,  sFW,  sTW,  sCL,  sCW,  sLA,  sES },
/*rst*/   {sCL,  sCL,  sSS,  sCL,  sCL,  sTW,  sCL,  sCL,  sCL,  sCL },
/
```

F I G.   1 3 A

```
/*        REPLY */
/*        sNO,  sES,  sSS,  sSR,  sFW,  sTW,  sCL,  sCW,  sLA,  sLI        */
/*syn*/   {sSR,  sES,  sSR,  sSR,  sSR,  sSR,  sSR,  sSR,  sSR,  sSR },
/*fin*/   {sCL,  sCW,  sSS,  sTW,  sTW,  sTW,  sCL,  sCW,  sLA,  sLI },
/*ack*/   {sCL,  sES,  sSS,  sSR,  sFW,  sTW,  sCL,  sCW,  sCL,  sLI },
/*rst*/   {sCL,  sCL,  sCL,  sCL,  sCL,  sCL,  sCL,  sCL,  sLA,  sLI },
/*none*/  {sIV,  sIV,  sIV,  sIV,  sIV,  sIV,  sIV,  sIV,  sIV,  sIV }
          }
```

F I G.   1 3 B

HIERARCHICAL PACKET PROCESSING SYSTEM AND METHOD, RELAY DEVICE AND SERVER

BACKGROUND OF THE INVENTION

1. Field of the Invention

The present invention relates to a packet relay technology for performing a filter process when relaying packets.

2. Description of the Related Art

Recently packet relay devices are provided with an advanced filter function to shut out unnecessary communication.

More particularly, a technology called "stateful inspection" can more finely control the passage permission/non-permission of packets by monitoring the states of higher-order communication sessions than an IP layer.

The stateful inspection recognizes a connection every time it receives a packet, updates the state of each connection and determines whether to pass the packet by checking it with filter conditions. The above-mentioned process must be applied to almost all packets, and it is not also limited to simple packet processes, such as the monitoring of both the higher-order layer header and payload section of a packet, their state management, the de-fragment/re-fragment of a packet and the like. For this reason, when embodied by hardware, the scale of the device becomes large.

Therefore, a method using a network processor is also considered. However, since this cannot ensure sufficient performance and programmable memory is also limited, it is proved that in reality the network processor cannot be mounted.

However, there is a technology for distributing the packet to the server and analyzing it in detail when a packet is analyzed in detail in the relay process of the network connection device in a system composed of a server and a network connection device. In this technology, firstly, the server, which is the distribution destination, must be recognized by a policy table beforehand. When receiving a packet, a process distribution unit distributing a packet to a service processing unit transfers the packet to the relevant packet service processing unit or a prescribed server according to the policy table. By this transfer, the process is externally distributed, and the process load of the network connection device can be reduced (see Patent Reference 1).

Patent Reference 1: Japanese Patent Application No. 2002-359637

As described above, in the technology for distributing the packet to a server, the distribution destination is designated in the policy table. Thus, the process distribution unit can distribute a process to each service processing unit or an external server.

However, when a server, being the distribution destination, is frequently shifted or a service provided by the server is changed, the distribution destination server designated in the policy table must be re-designated.

Therefore, much time and effort is necessary for the adjustment of a relay device due to the addition, modification and the like of a server, which is a problem.

SUMMARY OF THE INVENTION

It is an object of the present invention to provide a hierarchical packet processing technology for realizing a suitable and high-speed relay process in the addition/modification and the like of a server performing a service process.

The present invention is configured as follows to solve the above-mentioned problem.

One aspect of the hierarchical packet processing system of the present invention comprises a relay unit and a server, both performing a service process of a received packet and relaying the received packet. The relay unit comprises a call unit calling up a prescribed service processing unit performing the service process of the received packet, a first service processing unit performing the service process of the received packet by the call of the call unit and a second service processing unit performing a virtual service process of the received packet. The server comprises an external service processing unit performing an arbitrary service process of the received packet instead of the second service processing unit when the second service processing unit is called up by the call unit.

It can also be configured so that when the second service processing unit is called up by the call unit, the received packet is temporarily queued to a process request queue, and the service process of a subsequently received packet can be performed by a service processing unit subsequently called up by the call unit.

It can also be configured so that the external service processing unit can perform the above-mentioned service process using the idle time of a processor used for the relay process of a received packet in the relay unit.

It is also preferable for the system to further comprise a connection state management unit managing a connection state of a received packet, and to be configured so that the external service processing unit detects the state of the higher-order layer of the received packet, updates the connection state of the received packet managed by the connection state management unit, according to the detection result of the state of the higher-order layer and a filter process is applied to packets in the same connection state, received by the relay unit, according to the connection state of the connection state management unit updated by the external service processing unit.

It is also preferable for the system to comprise a service list management unit managing both information about a server for performing a service process and the identification information about a service process provided by the server according to the type of a packet in order to distribute the service process of the received packet to the server, and for the server to comprise a transfer unit transferring both information about the relevant server and the identifier of a service process provided by the relevant server to the service list management unit.

One aspect of the relay device of the present invention performs the service process of a received packet and relays the received packet. The relay device comprises a call unit calling up a prescribed service processing unit performing a service process of a received packet, a first service processing unit performing the service process of the received packet by the calling of the call unit, a second service processing unit performing a virtual service process of the received packet by the call of the call unit, a connection state management unit managing information based on the detection of the state of the higher-order layer of the received packet, a transmitting unit transmitting the prescribed information in the received packet to a prescribed server when the second service processing unit is called up by the call unit, a receiving unit receiving the information transmitted from the server, a reflection unit reflecting the received result in the received packet or the information managed by the connection state management unit and a filter processing unit applying a filter process to packets in the same connection state, according to information after the reflection managed by the connection state management unit.

It can also be configured so that when the second service processing unit is called up by the call unit, the received packet is temporarily queued to a process request queue, and the service process of a subsequently received packet can be performed by a service processing unit subsequently called up by the call unit.

It is preferable for the second service processing unit to comprise a service list management unit managing both information about a server for performing a service process and the identification information about a service process provided by the server according to the type of a packet in order to distribute the service process of the received packet to the server.

One aspect of the server of the present invention receives prescribed information in a packet received by a relay device from the rely device. The server comprises a connection state management unit managing connection state, a higher-order layer detection unit detecting the state of the higher-order layer of the packet and performing a service process, a connection state update unit updating the connection state of the packet managed by the connection state management unit, according to the state of the higher-order layer of the packet detected by the higher-order layer detection unit and a transmitting unit transmitting both the result of service process and the update information of the connection state to the relay device.

It is preferable for the server to comprise a transfer unit transferring both information about the relevant server and the identifier of a service process provided by the relevant server to the service list management unit managing both information about a server for performing a service process and identification information about a service process provided by the server, according to the type of a packet.

One aspect of the method of the present invention is used in the hierarchical packet processing system composed of a relay unit and a server, both performing a service process of a received packet and relaying the received packet. The relay unit calls up the first or second service processing unit performing the service process of the received packet. If the first service processing unit is called up, the relay unit performs the service process of the received packet. If the second service processing unit is called up, the relay unit performs a virtual service process of the received packet. When the second service processing unit is called up, the server actually performs a real service process of the received packet instead of the second service processing unit.

It is preferable to manage the connection state of a received packet by the connection state management unit, for the server to detect the state of the higher-order layer of the received packet and to update the connection state of the received packet managed by the connection state management unit, according to the detection result of the state of the higher-order layer, and for the relay unit to apply a filter process to received packets in the same connection state, according to the updated connection state of the connection state management unit.

One aspect of the program of the present invention can be executed by a relay unit and a server, both performing the service process of a received packet and relaying the received packet. In the relay unit, the program realizes a function to call up the first or second service processing unit, both performing a service process of the received packet, a function to perform the service process of the received packet if the first service processing unit is called up by the call, a function to perform a virtual service process of the received packet if the second service processing unit is called up by the call. In the server, the program realizes a function to perform a real service process of the received packet instead of the second service processing unit if the second service processing unit is called up.

It is preferable to manage the connection state of a received packet by the connection state management unit, for the server to detect the state of the higher-order layer of the received packet and to update the connection state of the received packet managed by the connection state management unit, according to the detection result of the state of the higher-order layer, and for the relay unit to apply a filter process to received packets in the same connection state, according to the updated connection state of the connection state management unit.

In the present invention, a service process is performed by the external service processing unit of a server, according to the call of the call unit. In this case, the server pretends that the process was performed by the relay unit, against the call unit, and conceals the respective existences of both the server actually performing the process and its service process.

For this reason, the call unit cannot recognize the server nor the service that the second service processing unit makes. Therefore, even if there is addition/modification or the like in the service process of the server or external service processing unit, there is no need to modify the setting of the call unit due to the addition/modification or the like.

In the present invention, when the server performs a service process, a received packet is temporarily stored in the process request queue, during which the received packets in the same connection state are processed.

Therefore, even if, for example, the server performs a complex process, there is no need to suspend the process of received packets in the same connection state till the complex process finishes, and the received packets in the same connection state can be consecutively processed.

The service process of the server is also performed using the idle time of a CPU used to perform the relay process of received packets in the relay unit.

Therefore, a relay process in the relay unit can be given priority over a service process in the server.

In the present invention, in the service process of the server, the state of the higher-order layer of the received packet is detected, and the connection state of the received packet managed by the connection state management unit is updated according to the detection result of the higher-order layer. A filter process is applied to packets in the same connection state received by the relay unit, according to their connection states after the update.

Therefore, the update of the connection state based on the state detection of the higher-order layer can be performed by the server. In the relay unit, the filter process can be performed simply referring to the connection state after the update.

In the present invention, both information about a server performing a service process and the identification information about a service process provided by the server, used to distribute the service process of the received packet from the relay unit to the server is registered from the server to a service list.

Therefore, a server to which a packet is distributed by the relay unit can be easily modified by transferring both information of the relevant server and the identifier of a service process provided by the relevant server from the server to the service list in the relay unit.

As described above, in the present invention, even when there is addition/modification or the like in a server performing a service process, the modification can be easily made. The relay process can also be performed at high speed.

BRIEF DESCRIPTION OF THE DRAWINGS

FIG. 1 explains the principle of the hierarchical packet processing technology applied to the present invention;

FIGS. 2A and 2B show mounting examples of the hierarchical packet processing technology applied to the present invention;

FIG. 3 is the functional block diagram of the hierarchical packet processing system;

FIG. 4A shows an example of state table;

FIG. 4B shows an example of an expect table;

FIGS. 9A and 9B show examples of messages;

FIGS. 12A and 12B show an example of the succeeding process of a server taking over the connection tracking process; and FIGS. 13A and 13B show the state change of "L4 status.

DESCRIPTION OF THE PREFERRED EMBODIMENTS

Figure 5:
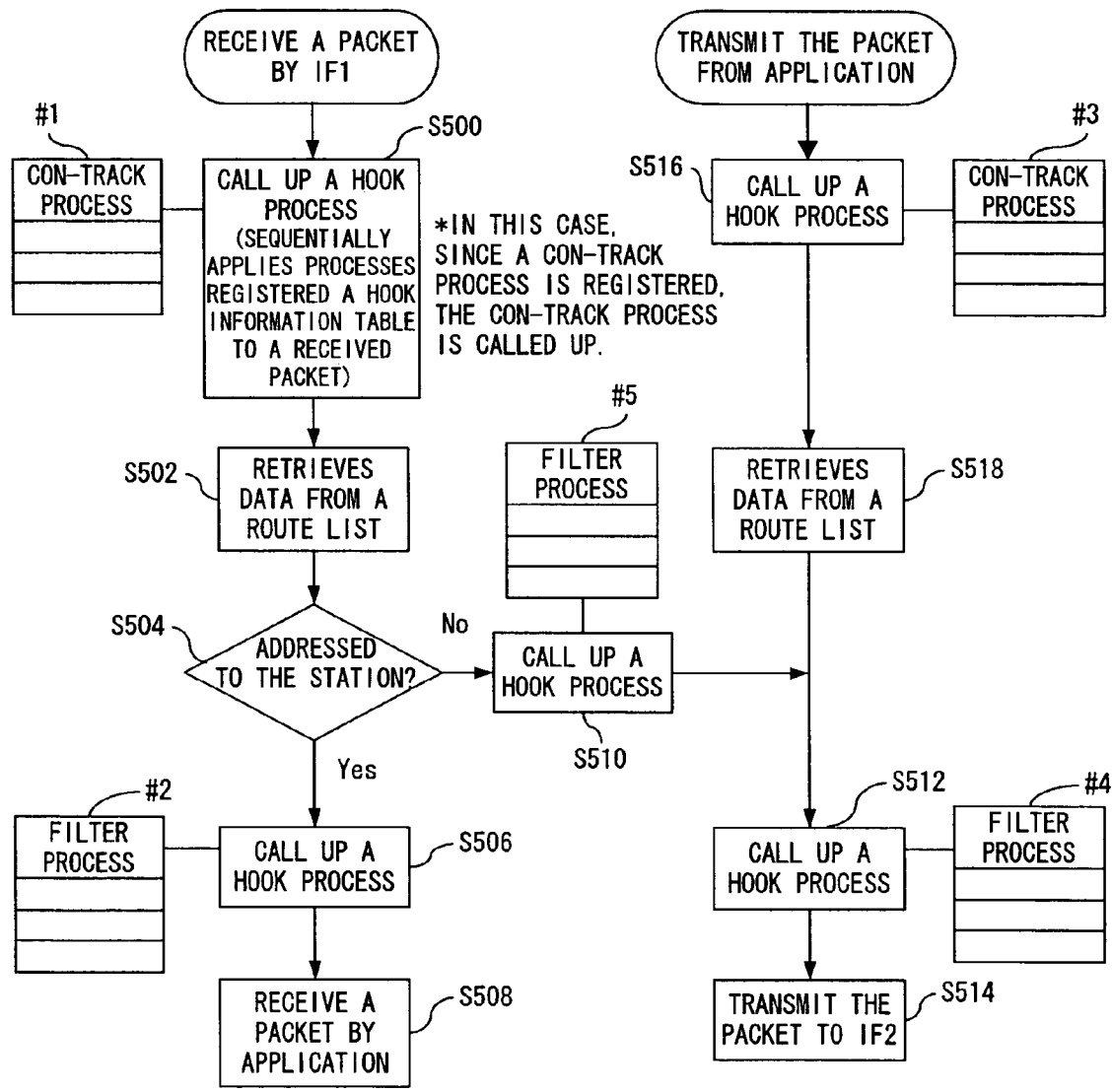
FIG. 5 is a flowchart showing the packet process indicated in the kernel unit of the relay device.

The preferred embodiments of the present invention are described in detail below with reference to the drawings.

FIG. 1 explains the principle of the hierarchical packet processing technology applied to the present invention. This hierarchical packet processing technology is suitably applied to a relay system connected between different or the same types of networks, and realizes the high-speed relay process of packets by distributing the packet service process of received packets among a relay (forwarding) unit and a server.

FIG. 1 is the logic block diagram of a processing system performing the packet service process of both the relay unit and the server.

The relay unit 1 shown in FIG. 1 comprises a call unit 1-1, a service processing unit 1-2 and a virtual service processing unit 1-3. The server 2 in FIG. 1 comprises a virtual call unit 2-1 and an external service processing unit 2-2.

The call unit 1-1 of the relay device 1 calls up the service processing unit 1-2 or the virtual service processing unit 1-3 according to a received packet, and makes the service processing unit 1-2 or the virtual service processing unit 1-3 independently performs its own service process of the received packet.

The service processing unit 1-2 performs packet-by-packet processes, such as a timer update process, a packet passage/discard process and the like, of the received packet while referring to a connection state management unit managing the connection state of the received packet, which is described later.

The virtual service processing unit 1-3 pretends to perform the service process executed by the virtual service processing unit 2-1 (hereinafter called "external service process") against the call unit 1-1 by assigning the execution of the service process of the received packet to the virtual call unit 2-1 of the server 2 and further receiving the execution result of the service process from the virtual call unit 2-1. As a suitable example of the external service process, there is a stateful process of analyzing the higher-order layer of a received packet and updating the corresponding connection state of the connection state management unit.

However, the external service processing unit 2-2 of the server 2 is virtually called up by the virtual call unit 2-1, actually performs the external service process assigned to the virtual call unit 2-1 by the virtual service processing unit 1-3 of the relay unit 1 and provides the virtual call unit 2-1 with the execution result. Then, the virtual call unit 2-1 returns the execution result to the virtual service processing unit 1-3 of the relay unit 1. In this case, if the stateful process is applied as the external service process, the connection state management unit is configured to be updated by the server 2, and the corresponding point of the connection state management unit is also updated.

The registration of information about what type of service process is assigned to the server 2 or to what server 2 the relevant service process is distributed or the modification of registered information is made by the server 2 and the virtual service processing unit 1-3.

Thus, according to this hierarchical packet processing technology, not only the relay unit 1 but also the server 2 can perform the service process of a received packet. In this case, more particularly, if the relay unit 1 performs a packet-by-packet process and the server 2 performs a complex and heavy process (stateful process) of upgrading the connection state management unit, there is no need for the relay unit 1 to perform the complex and heavy process of upgrading the connection state management unit. For this reason, the relay unit 1 can perform a simple and light process of determining the passage/discard of the received packet referring to the connection state management unit, updating a timer and the like. Furthermore, since the relay unit 1 and the server 2 perform a service process independently, high-speed packet relay can be realized by the relay unit 1 consecutively performing the service process of received packets without waiting for the completion of the service process of the server 2, which takes a long process time. Even if particular external service process is performed by particular server 2, a virtual service process, which looks a specific prescribed service process, is simply called up from the call unit 1-1 of the relay unit 1. Therefore, the type of an external service process of a received packet and the transfer destination of a server that performs the external service process can be modified without modifying the call setting of the call unit 1-1 calling up a variety of service processes and the setting of each unit that performs a packet-by-packet process. Since an external service by the call unit 1-1 of the relay unit 1 pretends to be called up by the virtual call unit 2-1 of the server 2, there is no need for the external service processing unit 2-2 of the server 2 to be aware of the setting modification of the corresponding relay unit 1.

More particularly, a high-speed packet relay process and flexible setting modification of an external service process can be enjoyed by realizing the respective functions of the virtual service processing unit 1-3 and each unit of the server 2 by software and realizing each unit that performs a packet-by-packet process by hardware.

Then, the mounting examples of the logic blocks are described below.

In these examples, this mechanism is mounted on Linux (trademark).

FIG. 2A shows a mounting example of the relay unit 1 shown in FIG. 1

According to FIG. 2A, the relay unit 1 comprises "NF_HOOK" 10-1, a service processing unit 10-2 providing a packet-by-packet process kernel function and a virtual bottom-half processing unit 10-3.

The "NF_HOOK" 10-1 in FIG. 2A is the function of a kernel. The "NF_HOOK" 10-1 refers to the header information of a received packet or a connection state management table that describes the connection state of the received packet, which is not shown in FIG. 2A, and determines whether the received packet performs a service process provided by the service processing unit 10-2 or a service process provided by the virtual bottom-half processing unit 10-3.

If a service process provided by the service processing unit 10-2 is applied to the packet, the NF_HOOK" 10-1 performs a process provided by a corresponding packet-by-packet process kernel function and obtains the process result. If a service process provided by the virtual bottom-half processing unit 10-3 (that is, external service process) is applied to the packet, the "NF_HOOK" 10-1 transfers the packet to the virtual bottom-half processing unit 10-3 and obtains the packet after the service process from the virtual bottom-half processing unit 10-3.

If a packet-by-packet process kernel function is called up, the service processing unit 10-2 applies a corresponding process (for example, timer update, filter process based on the reference of the connection state management table, etc.) mounted on the kernel to a received packet.

The virtual bottom-half processing unit 10-3 pretends to process the packet transferred from the "NF_HOOK" 10-1 against the "NF_HOOK" 10-1, and makes the server 2 perform its actual process. In this example, the virtual bottom-half processing unit 10-3 is described as a user process. Therefore, the virtual bottom-half processing unit 10-3 uses a process request queue 10-3-1 provided by the kernel so that a process can be exchanged between the "NF_HOOK" 10-1, being the function of the kernel, and the user process. The virtual bottom-half processing unit 10-3 further comprises a process extraction/writing function 10-3-2 to exchange a process with the process request queue 10-3-1 and a transfer function 10-3-3 to transfer the process request of the process (external service process of a packet) to the server 2 shown in FIG. 1 in the form of a proxy thread FP.

The transfer function 10-3-3 comprises a service list in which identification information about the external service process of a received packet and information about the server 2 that performs the external service process are recorded in a re-writable form. The transfer function 10-3-3 assigns the prescribed external service process of the received packet to a prescribe server 2, according to the service list. The transfer function 10-3-3 also receives information transmitted from the server 2 (for example, the update information of a service list, the result information of an external service process, etc.).

The process extraction/writing function 10-3-2 extracts process information from the process request queue 10-3-1, and edits the process information in order for the server 2 to perform its external service process, reflects the result information transmitted from the server 2 in a corresponding packet or writes the reflected packet into the process request queue 10-3-1.

FIG. 2B shows a mounting example of the server 2 shown in FIG. 1.

According to FIG. 2B, the server 2 comprises virtual "NF_HOOK" 20-1 and a "hook bottom-half execution kernel function" 20-2.

The virtual "NF_HOOK" 20-1 shown in FIG. 2B comprises a transfer function 20-1-1 to return a process reply (for example, the process result of an external service process, etc.) to the relay unit 1 and a process call function P to call up a process in the kernel of the server 2, provided by the "hook bottom-half execution kernel function" 20-2 in a form of a proxy thread SP. The virtual "NF_HOOK" 20-1 comprises apart of the process call function P (that is, the process call function K shown in FIG. 2B) in the kernel. In this example, the "hook bottom-half execution kernel function" 20-2 comprises a hook bottom-half function to enable a CPU (central processing unit) to perform with priority a process that must be performed with priority, and a process registered as the "hook bottom-half execution kernel function" is performed after the priority process is completed (for example, in the idle time of the CPU, etc.).

The transfer function 20-1-1 receives a process request transmitted from the relay unit 1 or transfers the result of an external service process of the process request to a corresponding relay unit 1. The transfer function 20-1-1 also updates the service list (the addition/deletion/modification of the type of an external service, the addition/deletion/modification of the information of a server that performs the external service) provided for the transfer function 10-3-3 of the relay unit 1.

The process call function P calls up the "hook bottom-half execution kernel function" 20-2 by a system call through the process call function K of the kernel, and performs a process corresponding to the process request received by the transfer function 20-1-1. Then, when receiving the execution result, the process call function P transfers the result to the transfer function 20-1-1.

In the above-mentioned process, the connection state management table, which is not shown, is updated from time to time. If both the server 2 and the relay unit 1 comprise the connection state management table, the connection state management table can be synchronized through the transfer function 20-1-1 of the server 2 and the transfer function 10-3-3 of the relay unit 1, based on the update of the connection state management table of the server 2. Thus, if both the server 2 and the relay unit 1 comprise the connection state management table, the connection state management table of the server 2 can be used as a state rewriting target, or the connection management table of the relay unit 1 can be used as a reference target or a timer update target.

The process can pretend to be called by the "NF_HOOK" of its own kernel, against the "hook bottom-half execution kernel function" 20-2.

The relay unit 1 and the server 2 can be mounted on a relay system for enabling a common CPU to perform those independent processes (hereinafter called "hierarchical packet processing system") or on a hierarchical packet processing system for enabling different CPUs to perform them. More particularly, if they are mounted on a hierarchical packet processing system with a common CPU, the CPU can perform the packet-by-packet process of the relay unit 1 by the hook bottom-half function, and the CPU can perform the external service process of the server 2 in its idle time.

FIG. 3 is the functional block diagram of the hierarchical packet processing system in the case where the relay unit 1 and the server 2 are mounted on different devices (relay device and server) connected through a communication cable.

The hierarchical packet processing system of this preferred embodiment comprises the relay device 300 and server 350, which are connected through a communication cable.

In the functional block diagram of the hierarchical packet processing system 30 shown in FIG. 3, the respective functions of the relay device 300 and the server 350 are shown separately for each device. As shown in FIG. 3, the relay device 300 comprises a kernel unit 301 and a resident program (hereinafter called "daemon") 302, and the server 350 comprises a kernel unit 351 and a daemon 352 enclosed by a broken line in FIG. 3.

As shown in FIG. 3, the daemon 302 comprises amount thread 303, a signaling thread 304, a proxy thread 305 and a service list, such as a reception table, a distribution table, a table ID and the like, which are described later. The daemon 352 also comprises threads with the same functions (a mount thread 353, a signaling thread 354 and a proxy thread 355) and transfer information (including information corresponding to the service list), such as a transmission table, a reception table, a table ID and the like, which are described later.

The mount threads 303 and 353 are processes (mount processes) generating mapping information of network interfaces for packet taking (IF 1 and IF2 shown in FIG. 3), set up in the relay device 300 and network interfaces virtually set up in the server 350 in the devices 300 and 350, respectively.

If the manager executes a mount command 356 in the server 350, an IF is designated according to the mount information 357 of the server 350 and a mount request to the IF is transmitted to the relay device 300. In the relay device 300, the manager executes amount permit list setting command 306 beforehand and sets an IF for permitting a mount in the mount permit list 307. Therefore, the relay device 300 returns a mount permit to the IF to which the mount request is issued, according to the set contents of the mount permit list 307 in reply to the mount request transmitted from the server 350. By this mount process, IF tunnel correspondence information is set both in the reception table 308 of the relay device 300 and in the transmission table 358 of the server 350, and the real IF of the relay device 300 is virtually generated in the server 350.

If the manager executes the mount permit list setting command 306, for example, network interfaces (IF1 and IF2 shown in FIG. 3) designating the external service process target of the server 350 of the network interfaces of the relay device 300 can be registered in a hook handler, which is described later.

If there is a plurality of servers 350, the network interfaces of the relay device 300 for which the service should be provided must be related to the respective virtual IFs of the plurality of servers 350. Therefore, in the mount process, the respective mapping information of the network interfaces of the relay device 300 and the respective virtual IFs of the plurality of servers 350 is set both in the reception table 308 of the relay device 300 and in the transmission table 358 of the server 350 using port numbers possessed by the process.

The signaling threads 304 and 354 are the processes (signaling processes) of setting in such a way that an external service process provided by the server 350 can be used by the relay device 300. In the signaling process, a transfer table is set between the devices 300 and 350 in such a way a process request message can be transferred from the relay device 300 to a prescribed server 350 when an external service process is called up in the relay device 300. In this signaling process, for example, the manager starts the system so that a prescribed service module provided for the server 350 can be called up by the relay device 300 by executing a service start command 359 in the server 350 shown in FIG. 3, and sets a service module correspondence table between the relay device 300 and the server 350 called up by the relay device both in the distribution table 309 of the relay device 300 and in the reception table 359 of the server 350. This process is described in detail later.

The daemons 302 and 352 comprise table IDs 310 and 360, respectively. In these table IDs, the location of a state table (partially corresponds to the connection state management table) provided for both the kernel unit 301 of the relay device 300 and the kernel unit 351 of the server 350, which is described later, is designated.

The proxy threads 305 and 355 are the processes (proxy processes) of enabling the server 350 to process a specific packet detected by a connection tracking process, which is described later, in the relay device 300 or synchronizing state tables mounted on the kernel units 301 and 351 of the relay device 300 and the server 350, respectively.

The proxy thread 305 receives the specific packet from the kernel unit 301, extracts all the information or information necessary for an external service process (hereinafter called "necessary information") from the packet and transmits a process request message including the packet or the necessary information to the proxy thread 355 of the server 350, according to the transmission table 308 and the distribution table 309 set by the mount process and signaling process, respectively. Upon receipt of the process request message, the proxy thread 355 transfers the process to the kernel unit 351 to make it perform the service process and receives the process result from the kernel unit 351. The proxy thread 355 transmits the process result (for example, modification information, information indicating the passage/discard of a packet, etc.) to the proxy thread 305 as a process reply message, according to the transmission table 358 and reception table 359 set by the mount process and the signaling process, respectively. Then, the proxy thread 305 returns the process result to the kernel unit 301. Furthermore, when detecting the update of the state table mounted on the kernel unit 351, the proxy thread 355 transmits the update information to the proxy thread 305 designated in the table ID as a table synchronization message, and the proxy thread 305 updates the state table mounted on the kernel 301.

Next, the kernel unit is described.

The process route of a packet is indicated by thick arrows in the kernel unit 301 of the relay device 300. The process route in this example comprises five hook processing units 311 through 315 and two routing processing units 316 (316-1 and 316-2). The process route further comprises hook information table 317, hook handler 318, a state table 319 and a filter rule 320.

A plurality of processes, such as a packet-by-packet process of performing a simple process, including a timer update process, a filter process of passing/discarding a packet, a connection tracking (or con-track) process of assigning a complex process to a server (hereinafter one partially including a packet-by-packet process is also called "connection tracking process") and the like can be registered in the hook information table 317. Although only the hook information table 317 of the hook processing unit 311 located in a position closest to the packet inlet (IF1 shown in FIG. 3) of the process route is shown in FIG. 3, each of the hook processing units 312 through 315 comprises a hook information table. Each of the hook processing units 312 through 315 applies a process registered in a hook information table corresponding to each of the hook processing units 312 through 315 to a received packet.

In this example, in the hook processing units 311 and 314, each hook information table is set so as to perform a connection tracking process, and in the other hook processing units 312, 313 and 315, each hook information table is set so as to perform a filter process (process of determining the passage/discard of a received packet referring to the filter rule 320 in which a rule setting unit 321 shown in FIG. 3 can freely define a filtering policy in a rewriting-free form or the state table 319 managing a session state, which is described later).

The hook handler 318 is called up in the connection tracking process set in the hook information table 317, and performs the connection tracking process of a received packet, according to the hook handler 318. When this connection tracking process is performed, the state table 319 is referenced from time to time.

Although particularly not shown, the hook processing unit 314 whose connection tracking process is set in the hook information table has the same configuration as the hook processing unit 311.

It is configured so that the state table 319 and the filter rule 320 can be referenced by another hook processing unit whose filter process is set in the hook information table.

When the connection tracking process, such as the packet-by-packet process, is performed in the hook processing unit 311 (also in the hook processing unit 314), the hook processing units 311 (also in the hook processing unit 314) immediately transfers the packet to a subsequent processing unit after timer update and receives a subsequent packet. If an external assignment process is performed, the hook processing units 311 assigns the process to the server 350 by queuing the packet to a process request queue (ip_queue) 322 shown in FIG. 3, and receives a subsequent packet. This process request queue 311 is the function of the kernel unit 301, and provides a mechanism for borrowing a packet from the kernel unit 301 and enabling the packet to be handled in a user space.

Communication between the process request queue 322 of the kernel unit 301 and the daemon 302 is conducted through a kernel socket (NETLINK) 323 shown in FIG. 3.

As described above, a state table to be paired with the state table 319 is mounted on the kernel unit 351 of the server 350. In this example, both the state tables are synchronized by a socket (CT-NETLINK) 324 shown in the kernel unit 301 of the relay device 300 and a socket 364 shown in the kernel unit 351 of the server 350.

However, the kernel unit 351 of the server 350 comprises a hook bottom-half 361, a service call module 362 and a state table 363 to be paired with the state table 319 mounted on the kernel unit 301 of the relay device 300.

The hook bottom-half 361 comprises a bottom-half handler (a mechanism for executing routine registered in the waiting matrix of the kernel). The hook bottom-half 361 executes a corresponding service module in the idle time of the CPU in reply to the call of the service call module 362, and returns the process result to the service module.

The hook bottom-half 361 updates the state table 363 according to the execution result.

The service call module 362 communicates with the daemon 351 through a kernel socket 364 shown in FIG. 3.

As described above, the socket (CT-NETLINK) 365 shown in FIG. 3 is a mechanism for synchronizing the state table 363 mounted on the kernel unit 351 of the server 350 with the state table 319 mounted on kernel unit 301 of the relay device 300.

The state table 363 manages currently recognized connection states. In this example, the state table 363 is used together with an expect table managing information about connections to be expected to be generated in the future, which is not shown in FIG. 3. The state table 319 is used independently.

FIGS. 4A and 4B show examples of the expect table used together with the state table 363, which is not shown in FIG. 3, and the state tables 319 and 363.

FIG. 4A shows an example of the state table 363 (or 319).

A state table 400 shown in FIG. 3 registers the identification symbol "T1" of a currently recognized connection in a "upward tuple" field 401 for connection recognition, and the attribute information about the connection "T1" is set in an "SRC IP" field 402, an "SRC PORT" field 403, a "DST IP" field 404, a "DST PORT" field 405, a "protocol type" field 406, an "L3 status" field 407, an "L4 status" field 408, a "helper" field 409, an "expecting" field 410, a "master" field 411 and a "timeout" field 412.

FIG. 4B shows an example of the expect table.

An expect table 450 shown in FIG. 3 registers an expected connection target in the "expecting" field 451, and information about of the expected connection is set in an "SRC IP" field 452, an "SRC PORT" field 453, a "DST IP" field 454, a "DST PORT" field 455 and a "protocol type" field 456.

The expected connection set in this expect table 450 is used as a candidate newly set in a state table 400.

Next, the flow of each process performed in the above configuration is described below with reference to FIG. 3.

FIG. 5 is a flowchart showing the process of a packet process route shown in the kernel unit 301 of the relay device shown in FIG. 3. In the following description, points related to FIG. 3 are described using the same reference numerals as in FIG. 3.

When the kernel unit 301 of the relay device 300 receives a packet from IF1, firstly, the hook processing unit 311 sequentially applies processes registered in the hook information table 317 to the packet (S500). In this example, since a connection tracking process is registered in the hook information table #1 (the hook information table 317 shown in FIG. 3), the hook processing unit 311 performs a connection tracking process by a hook handler (the hook handler 318 shown in FIG. 3), which is not shown in FIG. 5.

In this connection tracking process, for example, a packet-by-packet process or an external assignment process is performed according to the state of the received packet or the session state of the received packet. Then, after the packet-by-packet process or the external assignment process is completed, the packet is transmitted to a subsequent processing unit, and the connection tracking process of a subsequent received packet is performed. More particularly if the external assignment process is performed, the hook processing unit 311 can receive a subsequent packet and process the packet during the period since the packet is temporarily transferred to the process request queue 322 and the process can be assigned to the server 350. In this case, if the subsequent packet requires an external assignment process, the packet can be further stored in the process request queue 322. Therefore, the subsequent received packet can be smoothly relayed. If the result of the external assignment process is not discarded, the hook processing unit 311 applies the remaining process registered in the hook information table #1 to the packet in which an external assignment process is reflected.

Then, the routing processing unit 316-1 takes over the process of the packet. The routing processing unit 316-1 retrieves data from a routing table (S502) and it is determined whether the packet is addressed to the station (S504).

If the packet is addressed to the station, the hook processing unit 312 takes over the process of the packet, and sequentially applies processes registered in the hook information table 317 to the packet (S506). In this example, the hook processing unit 312 sequentially applies filter processes registered in a hook information table #2 to the packet. Finally, only permitted packets are received by application (S508).

However, if in step S504 it is determined that the packet is not addressed to the station, the hook processing unit 313 takes over the process of the packet. The hook processing unit 313 sequentially applies processes registered in the hook information table 317 to the packet (S510). In this example, the hook processing unit 313 sequentially applies a filter process registered in a hook information table #5 to the packet. Then, the hook processing unit 315 takes over the process of the packet, and sequentially applies the processes registered in the hook information table 317 (S512). In this example, the hook processing unit 315 sequentially applies filter processes registered in a hook information table #4.

Then, finally, the hook processing unit 315 transmits only permitted packets to IF2 (S514).

When the kernel unit 301 of the relay device 300 receives a packet from application, firstly, the hook processing unit 314 sequentially applies processes registered in a hook information table. In this example, the hook processing unit 314 sequentially applies connection tracking processes registered in a hook information table #3 (S516). Since the description of the connection tracking process is equivalent to that of the hook processing unit S311, its detailed description is omitted here.

Then, the routing processing unit 316-2 performs the routing process of the packet (S518). The hook processing unit 315 takes over the process of the packet, and sequentially applies the processes registered in the hook information table 317 to the packet (S512). In this example, the hook processing unit 315 sequentially applies the filter processes registered in the hook information table #4. Then, finally, the hook processing unit 315 transmits only permitted packets to the IF2 (S514).

Figure 6:
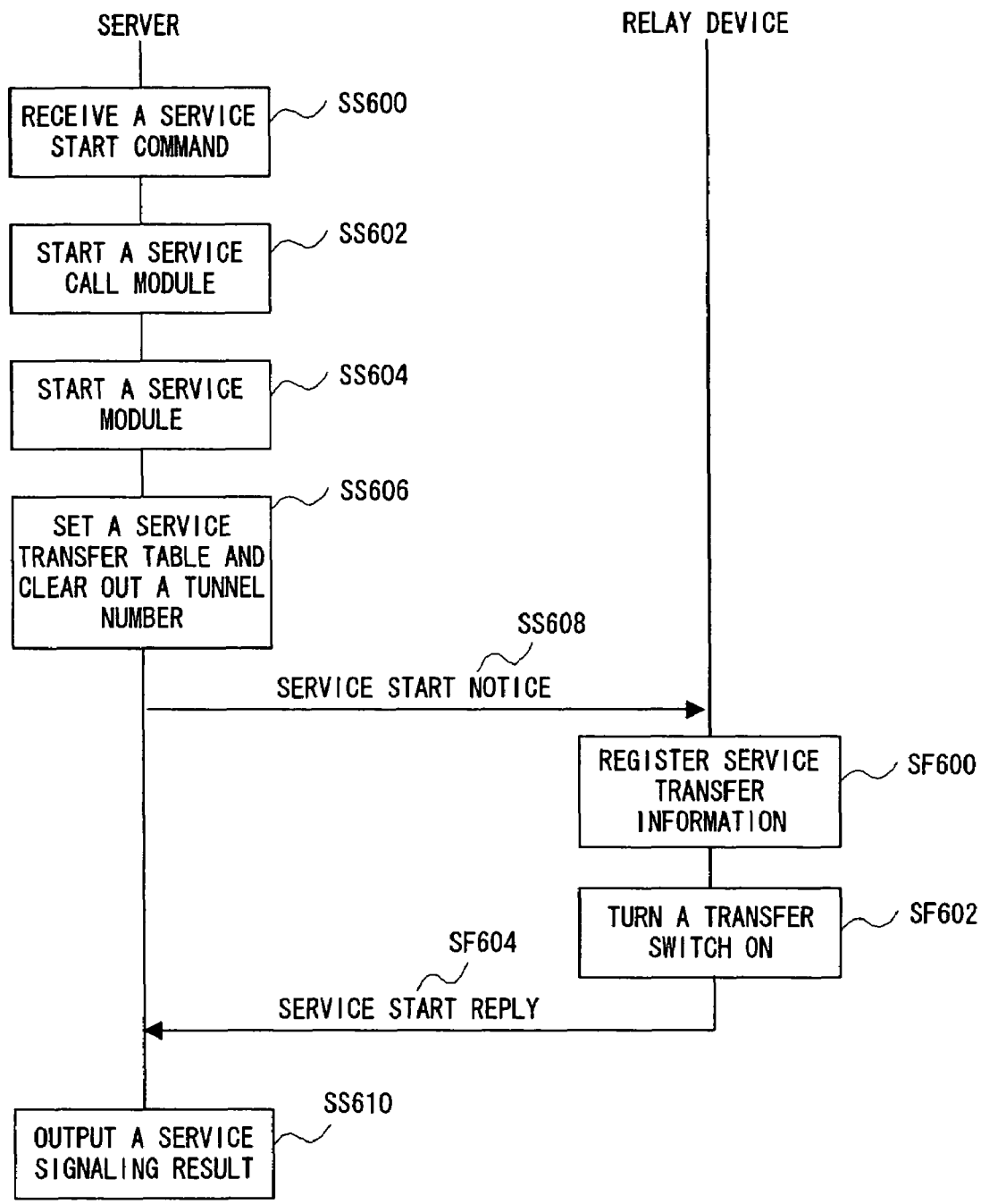
FIG. 6 shows an example of signaling sequence.

FIG. 6 shows an example of signaling sequence.

The signaling sequence sets in such a way a service process provided by the server 350 can be used by the relay device 300.

Firstly, the server 350 receives a service start command 359 (SS600). Then, the service call module 362 of the kernel unit 351 is started (SS602).

Then, the service module provided by the hook bottom-half 361 of the kernel unit 351 is started (SS604). In this process, the service module is incorporated into the kernel unit 351 for an external service process.

Then, after a service is related to a tunnel number, the tunnel number is cleared out (SS606). A service start notice indicating the start of the service is transmitted to the relay device 300 (SS608).

In the relay device 300, when receiving the service start notice from the server 350, service information about the external service process (for example, the identifier of an external service process, the type of a packet to which the external service process adapts (including a transmitting source address, transmitting destination address, etc.), the IP address, tunnel number, etc., of a server 350 to which the relay device 300 assigns the external service process) is registered in the distribution table 309 (SF600).

Furthermore, for example, if the execution/non-execution of an external assignment process can be switched by the hook handler 318, the hook handler 318 is set in such a way to transfer the packet to the process request queue 322 (SF602).

Then, the relay device 300 returns the reception of the service start notice to the server 350 as a service start reply (SF604).

In the server 350, when receiving the service start reply from the relay device 300, the registration result of the external service process is displayed on a command line (SS610).

Figure 7A:
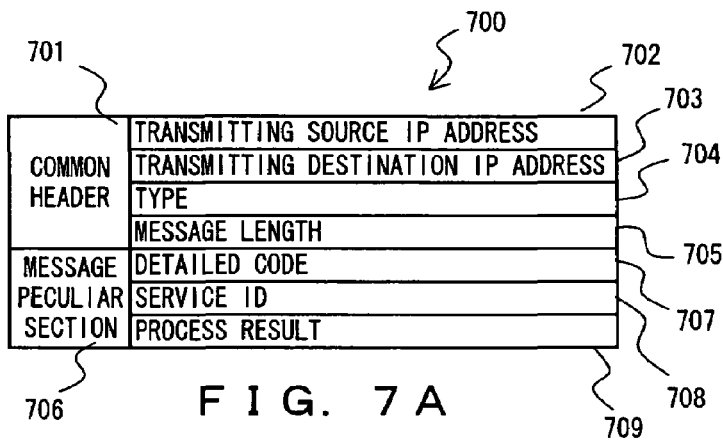
FIGS. 7A through 7C show examples of messages.
Figure 7B:
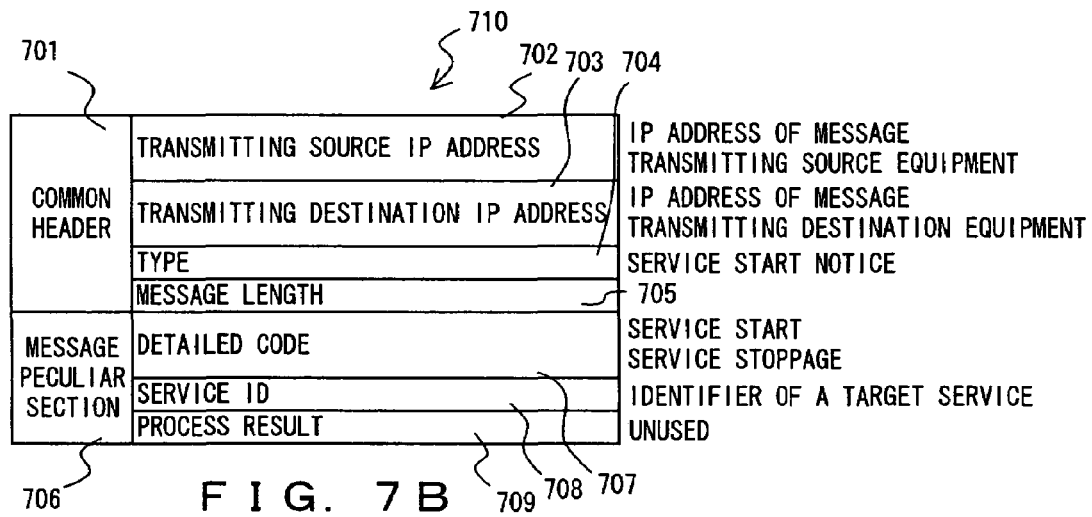
Figure 7C:
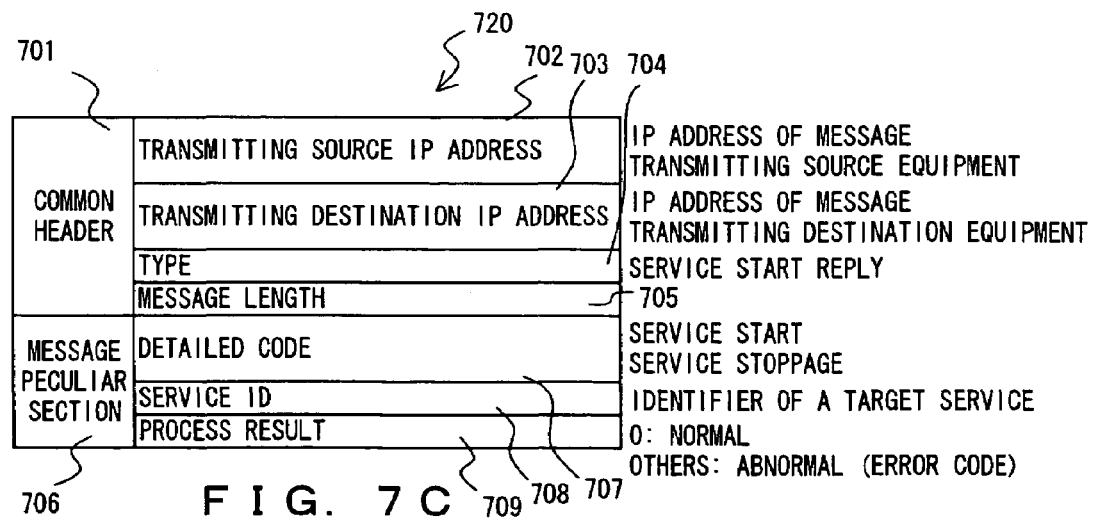

FIGS. 7A through 7C show examples of messages exchanged between the server 350 and the relay device 300 in the signaling sequence. FIGS. 7A, 7B and 7C show a message format, an example of the service start notice message and an example of the service start reply message, respectively.

The "common header" 701 of the message format 700 shown in FIG. 7A comprises a "transmitting source IP address" field 702 storing the IP address of each message transmitting source equipment, a "transmitting destination IP address" field 703 storing the IP address of each message transmitting destination equipment, a "type" field 704 storing the type of each message and a "message length" field 705 storing message length. A "message particular section" field 706 comprises a "detailed code" field 707 storing information indicating the start/stoppage of a service, a "service ID" field 708 storing identification information about an external service provided for the server 350 by the relay device 300 and a "process result" field 709 storing information indicating the reception result of the relay device 300 of an external service provided by the server 350.

As shown in FIG. 7B, the service start notice message 710 stores the following contents according to the message format 700.

The "transmitting source IP address" field 702 stores the "IP address of server 350", being the transmitting source equipment of the service start notice message 710. The "transmitting destination IP address" field 703 stores the "IP address of relay device 300", being the transmitting destination equipment of the service start notice message 710. The "type" field 704 stores information indicating the service start notice. The "message length" field 705 stores message length. Furthermore, the "detailed code" field 707 stores information indicating the start/stoppage of a service. The "service ID" field 708 stores identification information about an external service provided for the relay device 300 by the server 350 (the identifier of an external service, the type of a packet to which the external service is applied). The "process result" field 709 is not used in a service start notice.

As shown in FIG. 7C, the service start reply message 720 stores the following contents according to the message format 700.

The "transmitting IP address" field 702 stores the "IP address of relay device 300", being transmitting source equipment transmitting the service reply notice message 720. The "transmitting destination IP address" field 703 stores the "IP address of server 350", being the transmitting destination equipment of the service start notice message 710. The "type" field 704 stores information indicating a service start reply. The "message length" field 705 stores message length. Furthermore, the "detailed code" field 707 stores information indicating the start/stoppage of a service. The "service ID" field 708 stores identification information about the external service of a server 350 used by the relay device 300. The "process result" field 709 stores information indicating whether the packet is normally processed.

Figure 8:
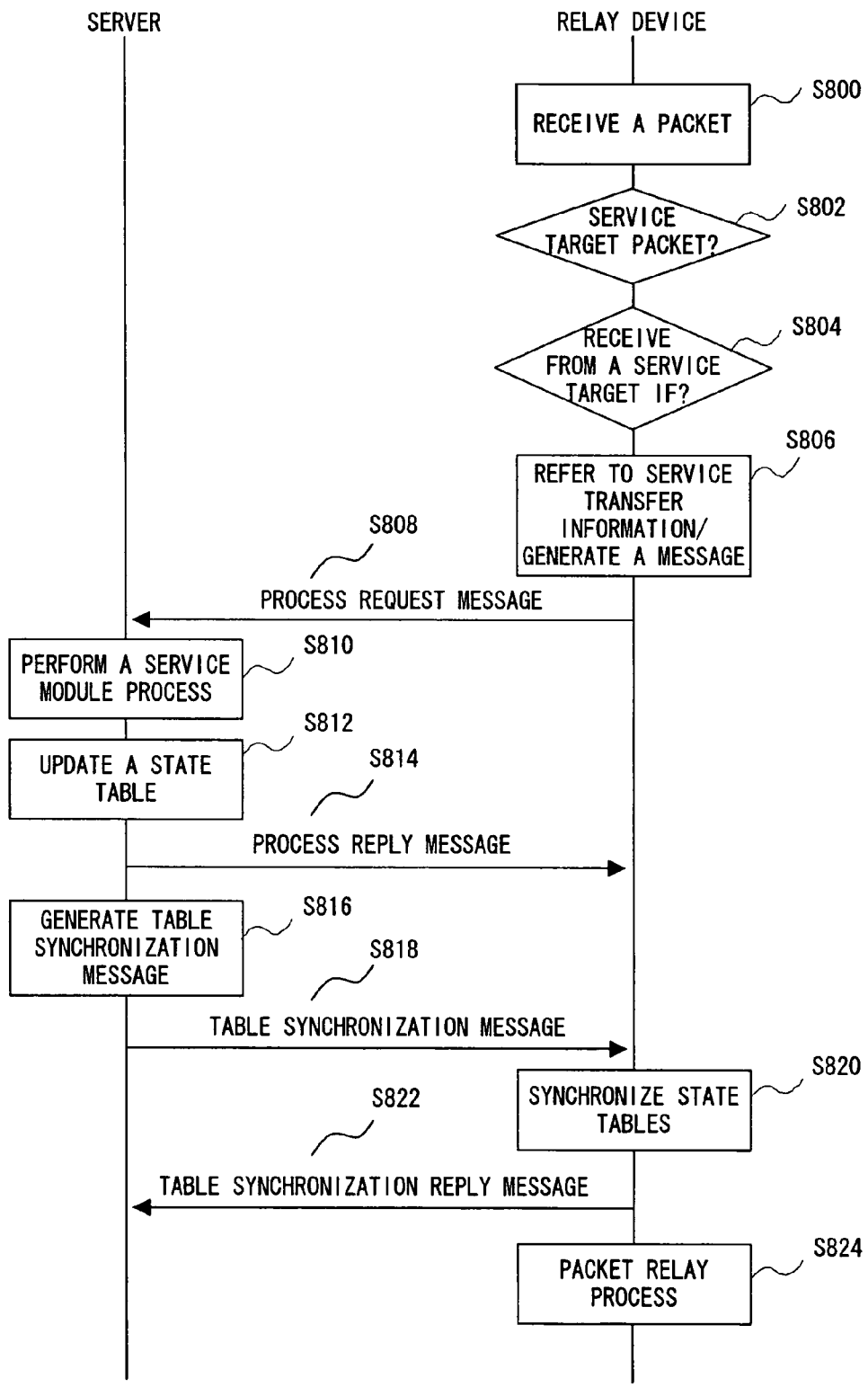
FIG. 8 shows the packet process sequence of the relay device and the server.

FIG. 8 shows the packet process sequence of the relay device 300 and the server 350 in the case where an external assignment process is performed when the hook processing unit 311 (or the hook processing unit 314) of the relay device 300 performs a connection tracking process.

Firstly, the hook processing unit 311 (or the hook processing unit 314) of the relay device 300 receives a packet (S800).

Then, by the hook processing unit 311 (or the hook processing unit 314) executing a connection tracking process, it is determined whether to apply an external assignment process to the packet (S802). Furthermore, it is determined whether the packet is received from a service target IF (S804). If the respective determinations in steps S802 and S804 are yes, the hook processing unit 311 (or the hook processing unit 314) transfers the packet to the process request queue 322, and the process request queue 322 transfers the packet to the proxy thread 305. The proxy thread 305 extracts information necessary for an external service process (partial packet information) from the packet, and generates a process request message, according to the partial packet information and information registered in both the reception table 308 and the distribution table 309 (S806). In this case, if the respective IP addresses of the transmitting destination server 350 are the same, a plurality of process requests can also be collectively stored in one process request message.

Then, the process request message is transmitted to the server 350 (S808).

In the server 350, when the proxy thread 355 receives the process request message transmitted from the relay device 300, a service module corresponding to a process designated by the process request message is called up from the hook bottom-half 361 through a service call module 362, and is performed, for example, using the idle time of the CPU (S810). Other processes are performed with priority over this process of the hook bottom-half 361, and service modules registered in the hook bottom-half 361 are performed in the idle time of these processes.

Then, the process result of the service module in the hook bottom-half 361 is transferred to the proxy thread 355 through the service call module 362, and if the process result requires the update of a state table, the state table 363 is updated (S812).

Then, the proxy thread 355 generates a process reply message according to the process result and information registered in the transmission table 358 and the reception table 359, and transmits the message to the relay device 300 that requested for the process of the process reply message (S814). In the process request queue 322, by this transmission, the packet is discarded according to the process result. Alternatively, the process result is reflected in the packet, and the packet after reflection is returned to the original hook processing unit 311 (or the original hook processing unit 314).

Furthermore, if the state table 363 is updated, a table synchronization message including the update information is generated in the server 350 (S816), and the table synchronization message is transmitted to the relay device 300 (S818).

Upon receipt of the table synchronization message from the server 350, the relay device 300 reflects the update information in the state table 319 of the reply device 300 (S820), and returns a table synchronization reply message to the server 350 (S822). Thus, the state tables can be synchronized.

Then, the relay device 300 relays the packet (S824)

FIGS. 9A through 10B show examples of the above-mentioned message.

FIG. 9A shows a example of the process request message.

When compared with the message format shown in FIG. 6, as to this process request message 900, information indicating the process request message, its sequence number of process request and a service call source identifier are stored in the "type" field 901, "sequence number" field 902 and "MARK value" field 903, respectively. Then, a plurality of process requests can be collectively stored in one process request message.

FIG. 9B shows an example of the above-mentioned process reply message.

When compared with the message format shown in FIG. 6, as to this process reply message 950, information indicating the process reply message, its sequence number and a service call source identifier are stored in the "type" field 951 of the process reply, "sequence number" field 952 and "MARK value" field 953, respectively. Then, a plurality of process replies can be collectively stored in one process reply message.

Figure 10A:
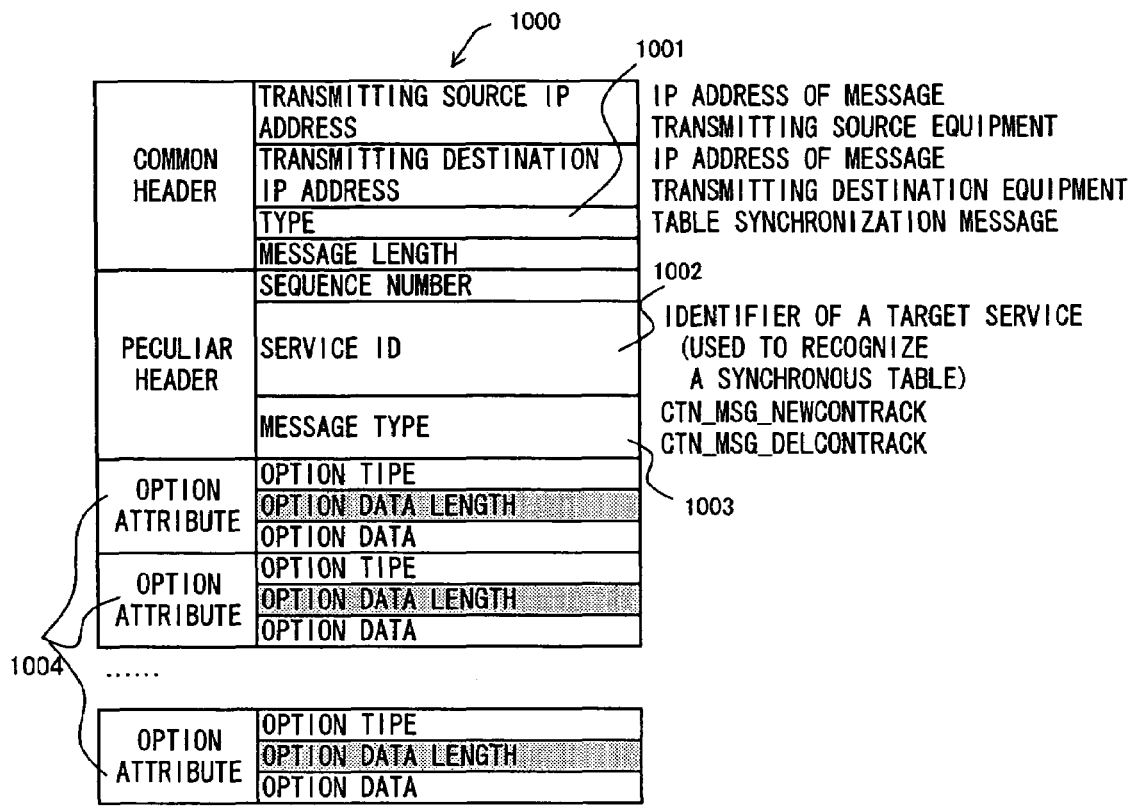
FIGS. 10A and 10B show examples of messages.

FIG. 10A shows an example of the above-mentioned table synchronization message.

As to this table synchronization message 1000, information indicating a table synchronization message, the identifier of a target service used to recognize tables to be synchronized and the message type of update, deletion or the like are stored in its "type" field 1001, "service ID" field 1002 and "message type" field 1003, respectively. Then, real update information is stored in its "option attribute" field 1004.

Figure 10B:
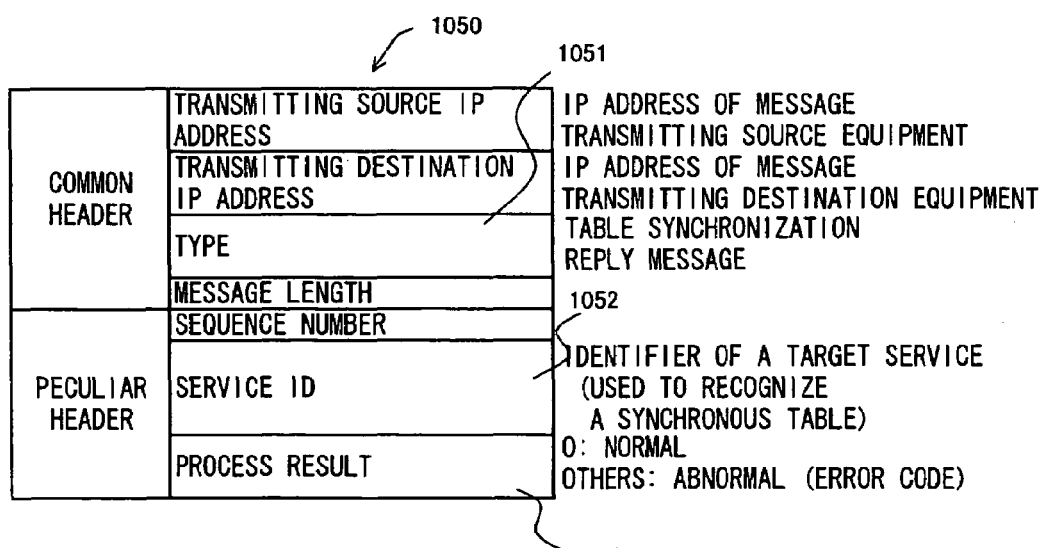

FIG. 10B shows an example of the above-mentioned table synchronization reply message.

As to this table synchronization message 1050, information indicating a table synchronization reply message, the identifier of a target service used to recognize tables to be synchronized and the result of update (normal/abnormal, etc.) are stored in its "type" field 1051, "service ID" field 1052 and "process result" field 1053, respectively.

Figure 11:
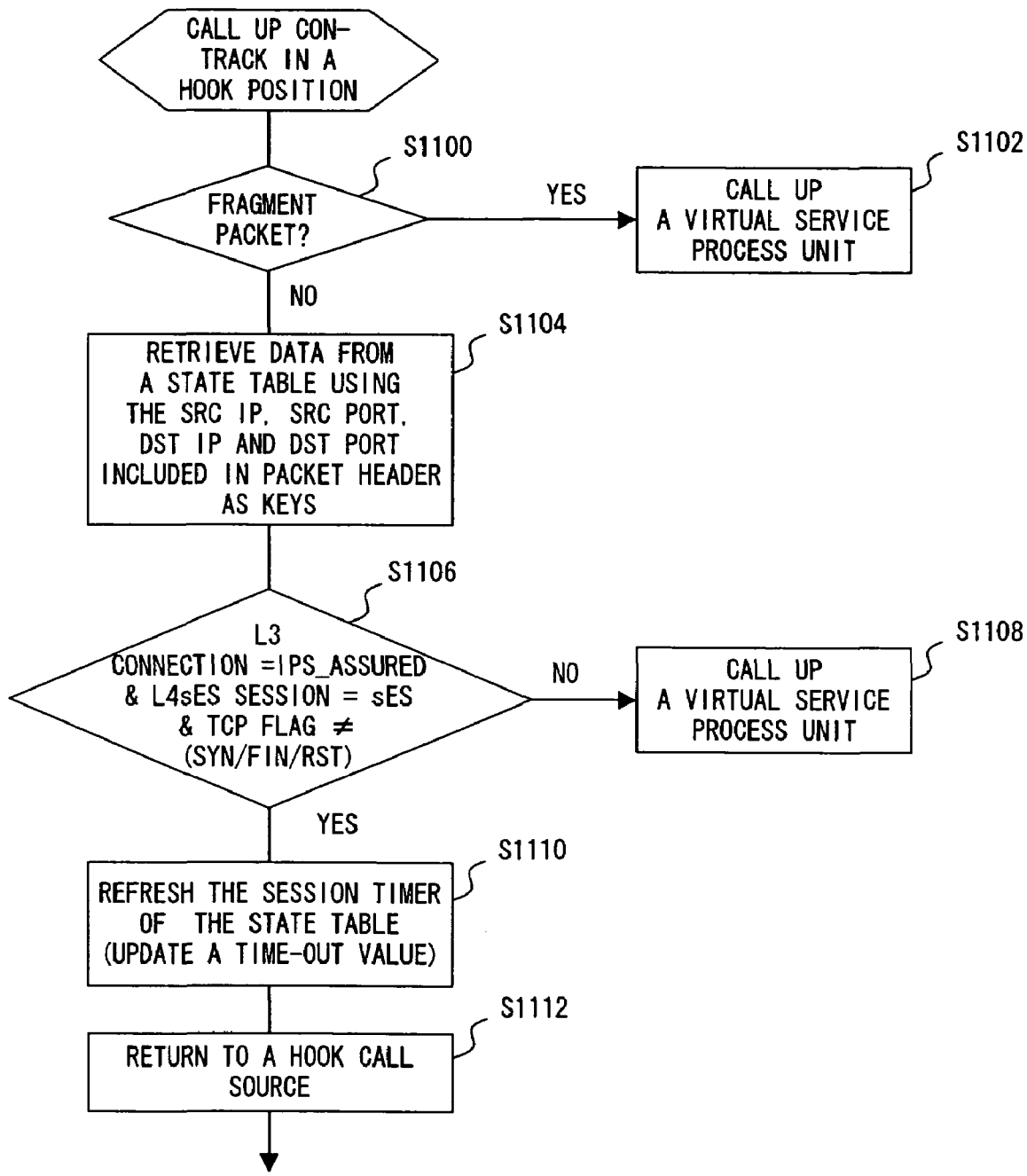
FIG. 11 shows an example of a connection tracking process performed by the hook handler of the relay device.

FIG. 11 shows an example of the connection tracking process performed by the hook handler 318 of the relay device 300.

When the hook processing unit 311 (or the hook processing unit 314) receives a packet and a connection tracking process designated in the hook information table 317 is called up, the hook handler 318 performs the following process.

Firstly, it is determined whether the packet is a fragment packet, based on its packet header (S1100).

If it is determined that the packet is a fragment packet, the virtual service processing unit is called up, and takes over the process of the packet (S1102). The take-over to virtual service processing unit of the packet process is made by transferring the packet to the process request queue 322.

If in step S1100 it is determined that the packet is not a fragment packet, the state table 319 is retrieved using the "transmitting source IP address (SRC IP)", "transmitting source port number (SRC PORT)", "transmitting destination IP address (DST IP)" and "transmitting destination port number (DST PORT)" of the packet header as keys in order to check the state of the packet (S1104).

Then, it is determined whether the packet can be processed in the relay device 300, based on the packet and attribute information hit by the retrieval of the state table 319 (S1106).

In this example, if an L3 connection state is "IPS_ASSURED", and if an L4 connection state is "eES" and if a transmission control protocol (TCP) flag is neither of SYN/FIN/RST, it is determined that the packet can be processed in the relay device 300. Since a packet whose connection is established in the future (a packet whose TCP flag is SYN) and a packet whose connection is disconnected in the future (a packet whose TCP flag is FIN) or the like do not meet the above-mentioned criterion. Therefore, in such a case, the virtual service processing unit is called up, and takes over the process of the packet (S1108).

However, if the packet meets the criterion, timer refreshment is applied to the session of the state table 319 (a time-out value is updated) (S1110).

Then, the process is returned to the call source of the connection tracking process (S1112), and if there is a subsequent process in the hook information table, the process is applied to the packet.

If the virtual service processing unit takes over the process, the processes in steps S1100 and after are applied to a subsequent packet.

Figure 12B:
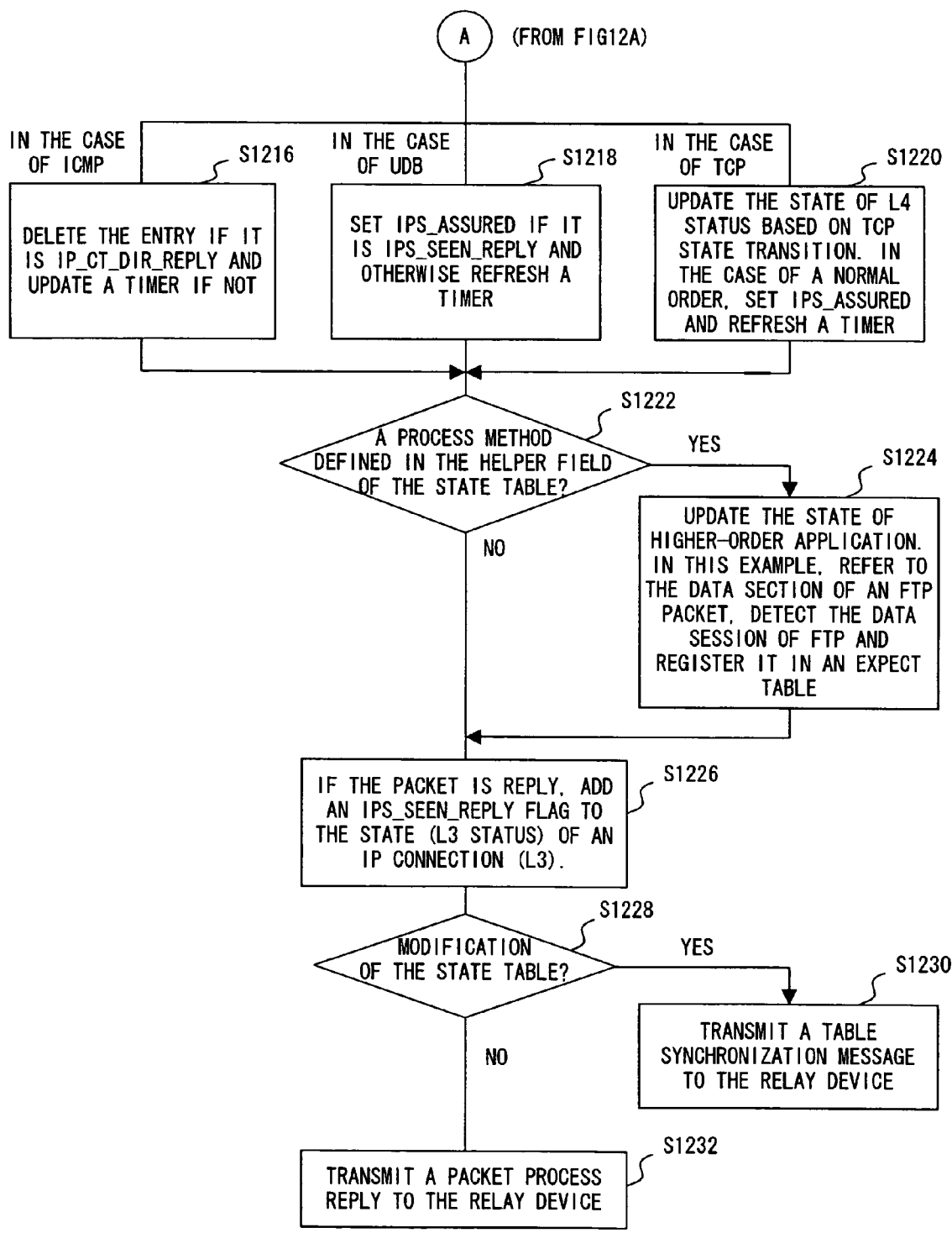

FIGS. 12A and 12B show examples of the above-mentioned take-over process of the connection tracking process of the server 350.

When receiving a process request message from the relay device 300, firstly the server 350 determines whether it is a request for a defragment process (S1200).

If it is determined that it is a defragment process, a defragment process is applied to the necessary information (although it can be the entire fragment packet, in this example, it is assumed that the entire packet or necessary information extracted from the fragment packet is stored in the process request message) stored in the process request message (S1202).

Then, when the defragment process of the necessary information is completed, it is determined whether the defragment process is completed for all of the necessary information (S1204). If it is determined that it is not completed for all of the information, the necessary information is stored in the server 350, and the fact that the necessary information is stored in the server 350 is transmitted to the relay device 300 (S1206). By this process, if the relay device 300 receives a fragment packet related to the necessary information stored in the server 350, the relay device 300 transmits the necessary information of the received packet to the server 350, and the server 350 repeats the defragment process to the necessary information. Then, when the server 350 receives all the necessary information of the defragment process, for example, within a predetermined time, the defragment process is completed.

Then, if in step S1200 it is determined that it is not a defragment process, or if in step S1204 it is determined that the defragment is completed, a connection to which the necessary information belongs is retrieved from the state table 363 (S1208). This retrieval can be made using the "transmitting source IP address (SRC IP)", "transmitting source port number (SRC PORT)", "transmitting destination IP address (DST IP)" and "transmitting destination port number (DST PORT)" included in the necessary information as keys.

Here it is determined whether the connection is registered in the state table 363 (S1210). If the connection is not registered, the attribute information of the connection, contained in the necessary information is newly registered in the state table 363 (S1212).

If it is determined the connection is registered in step S1210, or if in step S1212 it is newly registered in the state table 363, the event characteristic of the packet session of the necessary information is determined with reference to setting information in the "L3 status" field 407 of the state table 400 shown in FIG. 4A (S1214). For example, the event characteristic is determined according to setting information, such as "whether the packet is in the original direction", "whether the packet is in the reply direction", "whether the packet transmitted is in both the directions", "whether the connection is expected", "whether it is set so as not to expire fast" or the like, and is set in a table.

Then, in the case of Internet control message protocol (ICMP), if the event characteristic is that "the packet is set in the reply direction (IP_CT_DIR_REPLY)", the connection registration information of the packet is deleted from the state table 363. Otherwise, the timer of the connection in the state table 363 is updated (S1216).

In the case of user datagram protocol (UDP), if the setting information of the "L3 status" field 407 is that "the packet is transmitted in both the directions (IPS_SEEN_REPLY)", "IPS_ASSURED" is set in the "L3 status" field 407, and the timer of the connection is refreshed. Otherwise, the timer of the connection in the state table 363 is refreshed (S1218).

In the case of TCP, the state of "L4 status" is updated, according to the state transition table of TCP protocol.

FIGS. 13A and 13B show the state change of the "L4 status".

In FIG. 13A, the above-mentioned event characteristic is in the original direction, and in FIG. 13B, the event characteristic is in the reply direction.

In FIGS. 13A and 13B, the horizontal and vertical axes indicate the state change of the "L4 status" and the type of a flag in the TCP header of a received packet, respectively. However, none indicates that there is no set flag.

For example, if this received packet event characteristic is original and if the previous state of the "L4 status" state in which a flag is SYN is "ssS", it is updated to "sES".

In the case of a normal procedure, IPS_ASSURED is set. Otherwise, the timer is refreshed (S1220).

Then, it is determined whether a process method for updating higher-order application is defined in the "helper" field 409 of the state table 400 (S1222).

If the determination result is yes, the state of the higher-order application is updated (S1224). In the example of the state table 400 shown in FIG. 4A, "ftp_conntrack" is set in the "helper" field 409. In this process, the data session of FTP is detected referring to the data part of a FTP packet, and the information of this data session is registered in the expect table 450.

If the determination result in step S1222 is no or if the process in step S1224 is completed, a flag indicating that "the packet is transmitted in both the directions (IPS_SEEN_REPLY)" is added to the "L3 status" field 407 of the state table 400 if the packet is "reply" (S1226).

Then, it is determined whether the state table 400 is modified (S1228). If it is determined that the table is modified, a table synchronization message including the modification information is transmitted to the relay device 300 (S1230). If it is determined that the table is not modified, a process reply is transmitted to the relay device 300 (S1232).

Each process described above can also be distributed in the form of a program.

In that case, the program and file can be recorded and distributed on a storage medium, such as a floppy (trademark) disk, a CD-ROM, a DVD or the like. Alternatively, a part of the program and file or the entire program and file can be distributed through a transmission medium used in a public network and the like. In this case, upon receipt of it, a user can copy the program and file from a portable storage medium, such as a floppy disk, a CD-ROM, a DVD or the like to an external recording unit using a reader device (a part of an input/output device), such as CD-ROM device or the like. Alternatively, a user can copy the program and file from the Internet to an external recording unit through the communication unit of a computer. Then, by executing them by the CPU, the above-mentioned function can also be realized in the computer of the user.

As described above, in the preferred embodiment of the present invention, even if a server performing a service process must be added or modified, the modification can be easily made. A high-speed relay process can be realized.

What is claimed is:

1. A hierarchical packet processing system composed of a relay unit and a server, which applies a service process to a received packet and relays the received packet,
   said relay unit, comprising:
      a call unit for calling up a prescribed service processing unit for performing the service process of the received packet;
      a first service processing unit for performing the service process of the received packet by the call of the call unit; and
      a second service processing unit for performing a virtual service process of the received packet by the call of the call unit, and
   said server, comprising
      an external service processing unit for performing an arbitrary service process of the received packet instead of the second service processing unit, wherein said second service processing unit comprises
a service list management unit for managing information about a server performing a service process and identification information of a service process provided by the server according to the type of a packet, in order to distribute the service process of the received packet to the server,
said server comprises
a transfer unit for transferring information about itself and the identifier of a service process provided by the server, to the service list management unit, and
when said second service processing unit is called up by the call of said call unit, the received packet is temporarily queued to a process request queue, the second service processing unit extracts information from the received packet queued to the process request queue, generates a process request including extracted information and transmits the process request to the server in order to request the arbitrary service process of the received packet, and the first service processing unit called up sequentially by said call unit performs a service process of a subsequent received packet.

2. The hierarchical packet processing system according to claim 1, wherein
said external service processing unit performs the service process during the idle time of the processor to relay the received packet, of said relay unit.

3. The hierarchical packet processing system according to claim 1, further comprising
a connection state management unit for managing the connection states of received packets, wherein
said external service processing unit detects the higher-order layer state and updates the connection state of the received packet managed by the connection state management unit, according to the detection result of the higher-order layer, and a filter process is applied to packets received referring to the connection state by said relay unit, according to the connection state of the connection state management unit updated by said external service processing unit.

4. The hierarchical packet processing system according to claim 1, wherein
each of said relay unit and said server comprises
a connection state management unit for managing the connection state of the received packet; and
a synchronization unit for synchronizing the connection states managed by each connection state management unit, and
said server enables said external service processing unit to detect the state of the higher-order layer of the received packet and to update the connection state of the received packet managed by the connection state management unit, according to the detection result of the higher-order layer, and packets received in the same connection by said relay unit is permitted to be forwarded, according to the connection state after the update of said connection state management unit of said relay unit synchronized by the synchronization unit based on the connection state after the update of said connection state management unit of said server.

5. The hierarchical packet processing system according to claim 1, wherein
said second service processing unit extracts only information needed by said external service processing unit from the received packet queued to the process request queue.

6. The hierarchical packet processing system according to claim 1, wherein
when transmitting a plurality of process requests whose transmitting destination is the same server, said relay unit collectively transmits the plurality of process requests to the server.

7. A relay device which applies a service process to a received packet and relays the received packet, comprising:
a call unit for calling up a prescribed service processing unit for performing the service process of the received packet;
a first service processing unit for performing the service process of the received packet by the call of the call unit;
a second service processing unit for performing a virtual service process of the received packet by the call of the call unit;
a connection state management unit for managing information obtained by the detection of the state of a higher-order layer of the received packet;
a transmitting unit for transmitting prescribed information of the received packet to a prescribed server when the second service processing unit is called up by the call unit;
a receiving unit for receiving information transmitted from the server;
a reflection unit for reflecting the received result in the received packet or the information managed by the connection state management unit; and
a filter processing unit for applying a filter process to packets in the same connection state, according to the reflected information managed by the connection state management unit, wherein
when said second service processing unit is called up by the call of said call unit, the received packet is temporarily queued to a process request queue, the second service processing unit extracts the prescribed information from the received packet queued to the process request queue and generates a process request including extracted information, the transmitting unit transmits the process request to the server in order to request a service process of the received packet, and the first service processing unit called up sequentially by said call unit performs a service process of a subsequent received packet.

8. The relay device according to claim 7, wherein said virtual service processing unit comprises
a service list management unit for managing information about a server performing a service process and identification information of a service process provided by the server according to the type of a packet, in order to distribute the service process of the received packet to the server.

9. A method used in a hierarchical packet processing system composed of a relay unit and a server, which applies a service process to a received packet and relays the received packet,
the method of said relay unit, comprising:
calling up a first or second service processing unit for performing the service process of the received packet;
performing the service process of the received packet, if said first service processing unit is called up by the call; and
performing a virtual service process of the received packet, if said second service processing unit is called up by the call, and the method of said server, comprising
processing a real service process of the received packet instead of said second service processing unit, if said second service processing unit is called up, wherein
said relay unit comprises a service list management unit for managing information about a server performing a service process and the identification information of a service process provided by said server, according to the type of a packet, in order to distribute the service process of the received packet to said server,
said server transfers information about its own server and the identifier of a service process provided by its own server, to said service list management unit, and
when said second service processing unit is called up by the call, the received packet is temporarily queued to a process request queue, the second service processing unit extracts information from the received packet queued to the process request queue, generates a process request including extracted information and transmits the process request to the server in order to request the real service process of the received packet, and the first service processing unit called up sequentially by the call performs a service process of a subsequent received packet.

10. The method according to claim 9, wherein
said server performs the above-mentioned service process during the idle time of the CPU used to relay the received packet, of said relay unit.

11. The method according to claim 9, wherein
a connection state management unit manages the connection states of received packets, and
said server detects the higher-order layer state and updates the connection state of the received packet managed by said connection state management unit, according to the detection result of the higher-order layer, and
said relay unit applies a filter process to packets in the same connection state, according to the connection state of said updated connection state management unit.

12. A storage medium on which is recorded a program for enabling a computer a process,
said process of a relay unit for relaying packets, comprising:
calling up a first or second service processing unit for performing the service process of the received packet;
performing the service process of the received packet, if said first service processing unit is called up by the call; and
performing a virtual service process of the received packet, if said second service processing unit is called up by the call, and
said process of a server, comprising
processing a real service process of the received packet instead of said second service processing unit, if said second service processing unit is called up, wherein
said process of said relay unit comprising a service list management unit, comprises
managing information about a server performing a service process and identification information of a service process provided by the server, according to the type of a packet, in order to distribute the service process of the received packet to said server,
said process of said server, comprises
transferring information about its own server and the identifier of a service process provided by its own server, to said service list management unit, and said process of said relay unit performed when said second service processing unit is called up by the call, comprises:
temporarily queuing the received packet to a process request queue;
extracting information from the received packet queued to the process request queue;
generating a process request including extracted information;
transmitting the process request to the server in order to request the real service process of the received packet; and
performing a service process of a subsequent received packet in said first service processing unit called up sequentially by the call.

13. The storage medium according to claim 12, wherein
said process of said sever, comprising
performing the service process during the idle time of the CPU used to relay the received packet, of said relay unit.

14. The storage medium according to claim 12, wherein
said process of said server, comprising:
managing the connection states of received packets by said connection state management unit; and
updating the connection state of the received packet managed by the connection state management unit, according to the detection result of the state of the higher-order layer, and
said process of said relay unit, comprising
applying filter process to packets in the same connection state, according to the connection state of said updated connection state management unit.

15. The hierarchical packet processing system according to claim 1, wherein
said first service processing unit performs a packet-by-packet process, and
said external service processing unit performs a stateful process.

16. The relay device according to claim 7, wherein
said first service processing unit performs a packet-by-packet process.

17. The method according to claim 9, wherein
said server performs the real stateful process of the received packet instead of said second service processing unit.

18. The storage medium according to claim 12, wherein
said server performs the real stateful process of the received packet instead of said second service processing unit.

19. A hierarchical packet processing system composed of a relay unit and a server, which applies a service process to a received packet and relays the received packet,
said relay unit, comprising:
a call means for calling up a prescribed service processing means for performing the service process of the received packet;
a first service processing means for performing the service process of the received packet by the call of the call unit; and
a second service processing means for performing a virtual service process of the received packet by the call of the call unit, and
said server, comprising
an external service processing means for performing an arbitrary service process of the received packet instead of the second service processing means, wherein when said second service processing means is called up by the call of said call means, the received packet is temporarily queued to a process request queue, the second service processing means extracts information from the received packet queued to the process request queue, generates a process request including extracted information and transmits the process request to the server in order to request the arbitrary service process of the received packet, and the first service processing means called up sequentially by said call means performs a service process of a subsequent received packet.

20. A relay device which applies a service process to a received packet and relays the received packet, comprising:

call means for calling up a prescribed service processing means for performing the service process of the received packet;

first service processing means for performing the service process of the received packet by the call of the call unit;

second service processing means for performing a virtual service process of the received packet by the call of the call unit;

connection state management means for managing information obtained by the detection of the state of a higher-order layer of the received packet;

transmitting means for transmitting prescribed information of the received packet to a prescribed server when the second service processing means is called up by the call means;

receiving means for receiving information transmitted from the server;

reflection means for reflecting the received result in the received packet or the information managed by the connection state management means; and filter processing means for applying a filter process to packets in the same connection state, according to the reflected information managed by the connection state management means, wherein when said second service processing means is called up by the call of said call means, the received packet is temporarily queued to a process request queue, the second service processing means extracts information from the received packet queued to the process request queue, generates a process request including extracted information and transmits the process request to the server in order to request a service process of the received packet, and the first service processing means called up sequentially by said call means performs a service process of a subsequent received packet.

* * * * *